US010223795B2

(12) United States Patent
Schadewaldt et al.

(10) Patent No.: US 10,223,795 B2
(45) Date of Patent: Mar. 5, 2019

(54) DEVICE, SYSTEM AND METHOD FOR SEGMENTING AN IMAGE OF A SUBJECT (71) Applicant: KONINKLIJKE PHILIPS N.V., Eindhoven (NL)

(72) Inventors: Nicole Schadewaldt, Norderstedt (DE); Heinrich Schulz, Hamburg (DE); Daniel Bystrov, Hamburg (DE); Astrid Ruth Franz, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 187 days.

(21) Appl. No.: 15/325,096

(22) PCT Filed: Jun. 16, 2015

(86) PCT No.: PCT/EP2015/063441
§ 371 (c)(1),
(2) Date: Jan. 10, 2017

(87) PCT Pub. No.: WO2016/008665
PCT Pub. Date: Jan. 21, 2016

(65) Prior Publication Data
US 2017/0178340 A1 Jun. 22, 2017

(30) Foreign Application Priority Data

Jul. 15, 2014 (EP) .................... 14176985

(51) Int. Cl.
G06K 9/00 (2006.01)
G06T 7/12 (2017.01)
(Continued)

(52) U.S. Cl.
CPC .............. *G06T 7/12* (2017.01); *G06T 7/0012* (2013.01); *G06T 7/149* (2017.01);
(Continued)

(58) Field of Classification Search
None
See application file for complete search history.

(56) References Cited

U.S. PATENT DOCUMENTS 6,728,407 B1 4/2004 Horiuchi et al.
7,627,175 B2 12/2009 Le Clere et al.
(Continued)

OTHER PUBLICATIONS

Olabarriaga, S.D. et al., "Interaction in the segmentation of medical images: A survey", Medical Image Analysis 5 (2001) 127-142.
(Continued)

*Primary Examiner* — Atiba O Fitzpatrick (57) ABSTRACT

A device for segmenting an image of a subject (36), includes a data interface for receiving an image of the subject (36), which image depicts a structure of said subject (36). A translation unit translates a user-initiated motion of an image positioner into a first contour (38) surrounding said structure. A motion parameter registering unit registers a motion parameter of said user-initiated motion to said first contour (38). The motion parameter includes a speed and/or an acceleration of an image positioner. An image control point unit distributes a plurality of image control points (40) on the first contour with a density decreasing with the motion parameter. A segmentation unit segments the image by determining a second contour (44) within the first contour based on the plurality of image control points (40). The segmentation unit is configured to use one or more segmentation functions.

20 Claims, 3 Drawing Sheets (51) Int. Cl.
  *G06T 7/149* (2017.01)
  *G06T 7/00* (2017.01)
(52) U.S. Cl.
  CPC ............... *G06T 2207/20104* (2013.01); *G06T 2207/20116* (2013.01); *G06T 2207/20168* (2013.01); *G06T 2207/30004* (2013.01); *G06T 2207/30008* (2013.01)

(56) References Cited

U.S. PATENT DOCUMENTS

| | | | |
|---|---|---|---|
| 8,270,696 B2 | 9/2012 | Udupa et al. | |
| 2009/0297034 A1 | 12/2009 | Pettigrew et al. | |
| 2010/0189319 A1 | 7/2010 | Wu et al. | |
| 2012/0027277 A1 | 2/2012 | Vik et al. | |
| 2015/0078663 A1* | 3/2015 | Yahata | G06T 7/0083 382/173 |
| 2015/0348291 A1* | 12/2015 | Kohara | G06T 5/002 382/131 |

OTHER PUBLICATIONS

McInerney, T., "SketchSnakes: Sketch-line initialized Snakes for efficient interactive medical image segmentation", Computerized Medical Imaging and Graphics, Pergamon Press, NY, vol. 32, No. 5, Jul. 1, 2008, Abstract.

Fiorentino, M. et al., "3D Sketch Stroke Segmentaiton and Fitting in Virtual Reality", Proceedings of International Conference Graphicon, Jan. 1, 2003, pp. 1-8.

Qin S-F et al., "On-line segmentation of freehand sketches by knowledge-based nonlinear threshoiding operations", Pattern Recognition, Elsevier, GB, vol. 23, No. 0, Oct. 1, 2001, Abstract.

* cited by examiner

DEVICE, SYSTEM AND METHOD FOR SEGMENTING AN IMAGE OF A SUBJECT

CROSS-REFERENCE TO PRIOR APPLICATIONS

This application is the U.S. National Phase application under 35 U.S.C. § 371 of International Application Serial No. PCT/EP2015/063441, filed on Jun. 16, 2015, which claims the benefit of European Patent Application No. 14176985.1, filed on Jul. 15, 2014. These applications are hereby incorporated by reference herein.

FIELD OF THE INVENTION

The present invention relates to a device, system and method for segmenting an image of a subject. It finds application in medical imaging, in particular for diagnosis or treatment planning.

BACKGROUND OF THE INVENTION

In medical imaging, image segmentation is one of the most important tasks of surgical persons to obtain in-depth analysis of medical images. The goal of image segmentation is to identify a region of interest (ROI) and to highlight the boundary of the ROIs so that an operator carrying out image analysis is able to tell the ROIs from the rest of the image content.

There exist numerous tours for image segmentation. For instance, automatic processing is advantageous when it is applied to well defined structures and standard contouring definitions. However, this technique is sometimes unattainable due to limitations such as image acquisition errors, abnormalities in the image content and the presence of local image ambiguities. In order to overcome the afore-mentioned drawbacks of image segmentation based on pure automatic image processing, a number of approaches to incorporate user information into automatic image processing have been developed. In particular, user inputs are involved in contour correction in order to speed up and simplify the delineation of structures contained in the medical images.

There exist several main types of inputs which can be provided by the user during the interactive segmentation process. For instance, the user may set the value for one or more segmentation parameters such as the threshold level for binarization, weighting factors in a cost function of the deformable model, quality level used to define a quality criterion by an objective function, etc.

Other approaches enable the user to draw an initial contour around a target structure and to adjust the initial contour by improving its matching to the target structure. This can be done using one or more algorithmic models known in the art, including active contour, graph cut, elastic contour model and model-based segmentation, etc.

There exist also interactive segmentation tours which take user-initiated motions into account. When a user draws the initial contour, he usually sets an image positioner means such as a mouse into motion. This user-initiated motion is then translated into an initial contour. One example of these approaches is the life lane method where the mouse speed is used as an indication of local image quality in order to dynamically calibrate weights in a cost function. However, the approaches known in the art are limited in their accuracy and efficiency since the information about user-initiated motions is not effectively applied to speed up a process of image segmentation.

In addition, the delineation of structures on 3D medical images slice by slice is tedious and time consuming. Though current delineation tools allow the user to outline a structure or fill it from within, the required accuracy of the user is rather high. Some smart tools snap to image gradients, but the delineation still requires a lot of precise mouse movements. The planning of intensity modulated radiotherapy requires delineation of risk structures in the planning CT. Often, this is done manually and the user has to outline the structure carefully with a contouring tool, which is very time consuming. To outline all structures for a head & neck RT planning case might take up to 10 hours. There are some image processing techniques to aid this process: For example the lung can be contoured by setting a threshold and a seed point. However, this strategy only works for very few structures. Automated or semi-automated contouring methods exist, but still need to be corrected or re-done for many cases. Further, many algorithms require prior knowledge on structures to contour from a library. Thus, for many known structures and all new or uncommon structures, still a lot of time is needed for accurate delineation.

In "Olabarriaga et al., Interaction in the segmentation of medical images: A survey", Medical Image Analysis 5 (2001) 127-142, existing interactive segmentation methods are discussed with respect to the aspects including the type of user input, how the user input affects the computational part of the segmentation process and the purpose of user interaction.

SUMMARY OF THE INVENTION

It is an object of the present invention to provide a device, system and method for segmenting an image of a subject which enable improved utilization of user input regarding one or more user-initiated motions in order to perform the image segmentation more efficiently and reliably.

In a first aspect of the present invention a device for segmenting an image of the subject is presented that comprises a data interface for receiving an image of said subject, said image depicting a structure of said subject, a translation unit for translating a user-initiated motion of an image positioner means into a first contour surrounding said structure, a motion parameter registering unit for registering a motion parameter of said user-initiated motion to said first contour, said motion parameter comprising a speed and/or an acceleration of said image positioner means, an image control point unit for distributing a plurality of image control points on said first contour with a density decreasing with said motion parameter, and a segmentation unit for segmenting said image by determining a second contour within said first contour based on said plurality of image control points, said segmentation unit being configured to use one or more segmentation functions.

In a further aspect of the present invention a system for segmenting an image of a subject is presented that comprises an imaging apparatus for generating at least one image of the subject and a device as disclosed herein for segmenting the generated at least one image. The system according to the present invention thus combines the afore-mentioned advantages of the device disclosed herein and the possibility of generating images. This is particularly advantageous for applications such as diagnosis or therapy planning where both the image generation and the image segmentation need to be performed with highly efficiency and accuracy.

In a further aspect of the present invention a method for segmenting an image of a subject is presented which comprises the steps of receiving an image of the subject, the image depicting a structure of the subject, translating a user-initiated motion of an image positioner means into a first contour surrounding the structure, registering a motion parameter of the user-initiated motion to the first contour, the motion parameter comprising a speed and/or an acceleration of the image positioner means, distributing a plurality of image control points on the first contour with a density decreasing with the motion parameter, and segmenting the image by determining a second contour within the first contour based on the plurality of image control points, the segmentation unit being configured to use one or more segmentation functions, in particular active contour and/or model based segmentation and/or graph cut.

In yet further aspects of the present invention, there are provided a computer program which comprises program code means for causing a computer to perform the steps of the method disclosed herein when the computer program is carried out on a computer as well as non-transitory computer-readable recording medium that stores therein a computer program product, which, when executed by a device, causes the method disclosed herein to be performed.

Preferred embodiments of the invention are defined in the dependent claims. It shall be understood that the claimed system, method and computer program have similar and/or identical preferred embodiments as the claimed device and as defined in the dependent claims.

The present invention enables a more efficient and reliable interactive image segmentation, in particular a smart lasso approach. In particular, the registered motion parameter of the user-initiated motion is utilized to distribute the plurality of image control points on the first contour. A user performing image segmentation tends to move the image positioner means, such as a mouse, more quickly when he is more certain about the result of the motion initiated by him. This is the case when the structure of the subject is clearly visible. In contrast, the user tends to move the mouse more slowly, when a strong image gradient is reasonably close to the mouse cursor which the user controls by moving the mouse, so that the user feels that high accuracy is necessary. Consequently, if the motion parameter is partially high and partially low during the user-initiated motion, the first contour created by the user may usually be separated into regions with higher accuracy or "high accuracy regions (HAR)" and regions with lower accuracy or "low accuracy regions (LAR)". The HARs are comparatively close to the target segmentation result comprising one or more nearest interior boundaries.

A person skilled in the art understands that such a separation is only qualitative and relative but not quantitative or absolute. It is also understood by the skilled person that the HARs of the first contour correspond to the structure of the subject comparatively better than the LARs due to the comparatively higher accuracy. Since the density of the image control points decreases with the motion parameter, there are comparatively more image control points in the HARs than in the LARs in the case when both HARs and LARs are present in the first contour. In such case, the second contour is determined more based on the HARs than the LARs of the first contour, resulting in increased efficiency and reliability of image segmentation. The skilled person understands that the present invention is not limited to the case when both HARs and LARs are present in the first contour, but the first contour may comprise predominantly HARs or LARs. Independent on the actual configuration of the first contour, the present invention enables reliable result of image segmentation, so that the user is relieved from stress of needing to be very accurate all through the user-initiated motion. The segmentation and delineation process thus becomes less tedious.

In this context, the image positioner means may typically comprise a mouse. This is, however, not limiting the present invention as the image positioner means may comprise any means suitable for the user to perform the user-initiated motion which can be translated into a contour on a display unit, such as a monitor, a screen or a display. In particular, the image positioner means may comprise a cursor cooperating with a mouse, an electronic painting device or a touch-screen. The image control points comprise punctual image objects which can be positioned at specific positions of an image in order to highlight an area and/or modify the image content. The one or more segmentation functions comprise any function known for the application of image segmentation. It is understood by the person skilled in the art that the segmentation functions comprise in particular active contour, model based segmentation and graph cut, wherein further functions either alone or in combination with each other, such as level set, region growing, deformable contours, statistical shape models, interactive methods may also be used. The skilled person understands further that the density of the image control points is determined by the distance between adjacent image control points measured along the first contour.

In a preferable embodiment, the segmentation unit is configured to identify a plurality of target points within the first contour, the target points lying each within a volume and/or a path beginning at a corresponding one of the image control points, the second contour being formed by connecting the plurality of target points. Preferably, adjacent target points may be connected to determine the second contour. The volume may preferably comprise one or more cylindrical volumes, in particular around one or more lines perpendicular to the edge of the first contour. Since there are comparatively more image control points in the HARs than in the LARs, there are consequently more target points identified corresponding to image control points of the HARs than the LARs. Advantageously, this enables to determine the second contour with increased accuracy and efficiency.

In another preferable embodiment, the path comprises a straight path, the straight path being perpendicular or oblique to an edge of the first contour and/or having a length increasing with the motion parameter. The straight path is relatively easy to define compared to other shapes or forms such as a curved path. As a result, identifying the target points and consequently the image segmentation is simplified. Further, a straight path perpendicular to the edge of the first contour has a well-defined direction relative to the first contour. The straight path can thus be easily and reliably defined for each image control point. In addition, the straight path is shorter for image control points in the HARs and longer for image control points in the LARs. The present invention thus takes into account that the distance between the structure and the first contour is smaller in the HARs than in the LARs and enables image segmentation with high precision.

In another preferable embodiment, the segmentation unit is configured to analyze an image parameter of the image over the volume and/or the path and identify the target points where it detects a peak of the image parameter. Measuring image parameters is advantageous for identifying the target points with high accuracy since a quantitative analysis of image properties is possible so that even ambiguous image details can be taken into account during segmentation. The image parameter may comprise any image parameter known in the field of image segmentation, such as image gradient, gray value, contrast, etc.

In another preferable embodiment, the image parameter comprises an image gradient, the segmentation unit being configured to identify the target points where it detects a gradient peak of the image gradient. The image gradient is a suitable parameter since the presence of image gradients indicates a boundary between two or more groups of image contents corresponding to different materials/tissues/structures. Advantageously, the present invention enables accurate and easy contour correction.

In another preferable embodiment, the gradient peak comprises a maximum gradient peak and/or a first gradient peak beginning from said image control point. The maximum gradient peak is understood as obtained by finding the maximum value of the image gradient detected all over the volume and/or the path. In this way, the target point can be located at the boundary between two different material and/or tissue types with high accuracy. This advantageously leads to increased reliability of the interactive image segmentation. Further, the present invention takes into account that the distance between the first contour and the structure of the subject is relatively small in certain regions of the first contour, in particular in the HARs. For such regions, it is very likely that only one gradient peak is present within a short distance from the corresponding image control point. Therefore, it is sufficient to detect the first gradient peak in order to detect a maximum gradient peak or a gradient peak close to the maximum gradient peak in its magnitude and/or position. Advantageously, the efficiency of the image segmentation is further increased.

In another preferable embodiment, the segmentation unit is configured to identify the target points only if the gradient peak is above a predefined threshold gradient. It can be prevented in this way that target points that are not qualified for reasonably defining the second contour are identified. Advantageously, the reliability of image segmentation is further increased.

In another preferable embodiment, the second contour comprises a distance to the first contour increasing with the motion parameter. A band is formed in this way as being defined by the first and the second contour, wherein the bandwidth is larger in the LARs than in the HARs. Such a band advantageously serves as a refined starting point for the graph cut, instead of a randomly chosen band, thus leading to increased reliability of the segmentation result.

In another preferable embodiment, the image comprises a first and a second image slice, further comprising a transferring unit for transferring the structure and/or the first contour and/or the second contour from the first to the second image slice. In this way, the structure and/or and first contour and/or the second contour can be used to segment the second image slice. This advantageously improves the image segmentation by adjusting the first and/or the second contour or by predicting a new contour.

In another preferable embodiment, the image control point unit is configured to distribute a plurality of additional image control points without using the motion parameter. In particular, the path corresponding to the additional image control points comprises a length correlated with a curvature of the structure. Advantageously, the present invention enables both interactive image segmentation and automatic image segmentation and a combination of both, leading to increased user flexibility.

In another preferable embodiment, the motion parameter registering unit is configured to signal an error when said motion parameter is below a predefined threshold parameter. The present invention enables to indicate a segmentation result that is counter-intuitive to the image content, for instance due to the presence of implants, or to indicate the case where no image gradient can be measured. Advantageously, this leads to a more secure and reliable image segmentation.

BRIEF DESCRIPTION OF THE DRAWINGS

These and other aspects of the invention will be apparent from and elucidated with reference to the embodiment(s) described hereinafter. In the following drawings

DETAILED DESCRIPTION OF THE INVENTION

Figure 1:
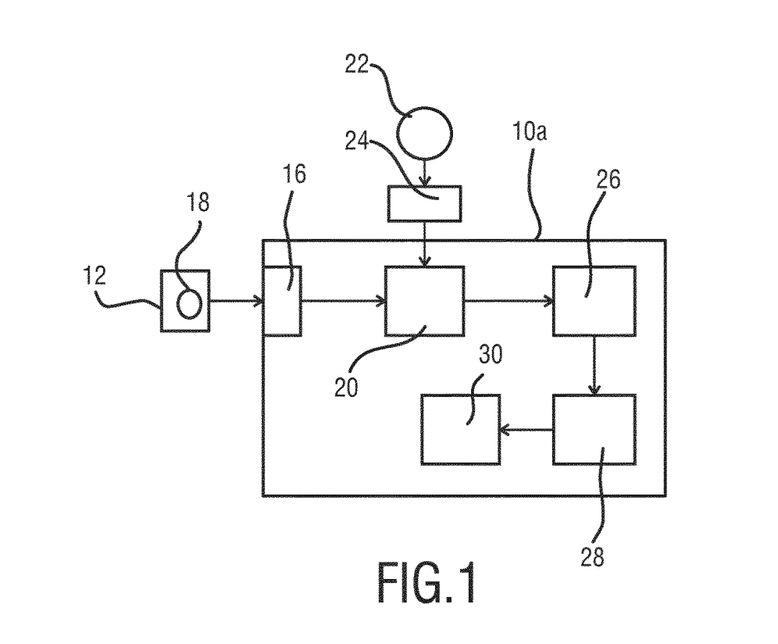
FIG. 1 shows a schematic block diagram of an embodiment of a device according to the present invention.

With reference to FIG. 1, a schematic block diagram of the device 10a for segmenting an image 12 of a subject in accordance with a first embodiment is shown. The device 10a comprises a data interface 16 for receiving the image 12 of the subject. The image 12 comprises a structure 18 which corresponds to a part of the subject. The subject is typically a living being such as a human, wherein the part to which the structure 18 corresponds may e.g. comprise an anatomical structure such as the lung, the brain, the heart, the stomach, etc. It is understood by the person skilled in the art that the structure 18 is enclosed by a boundary separating the structure 18 from the image content of the image 12 outside the structure 18.

The data interface 16 may be any type of data interface known in the art, in particular a data connection between an imaging apparatus to the device 10a. Such a data connection serves to transfer image data from the imaging apparatus to the device 10a for image segmentation. The types of the data interface 16 may include, without being limited to, Current Loop, RS-232, GPIB, V. 35, etc.

The device 10a comprises a translation unit 20 for translating a user-initiated motion 22 of an image positioner means 24 into a first contour, wherein the structure 18 is surrounded by the first contour. The image positioner means 24 may comprise a mouse. Alternatively, the image positioner means 24 may comprise a mouse cursor which is controlled by a mouse or by the user's finger or another means which enables moving the cursor on a screen, in particular a touchscreen. In a preferable embodiment, the translation unit 20 is configured to process motion data corresponding to the user-initiated motion 22 and to generate the first contour based on the motion data. In another preferable embodiment, the translation unit 20 is configured to further enable adding and/or modifying the first contour, for instance modifying the thickness and/or the brightness and/or the type of line used for visualizing the first contour, such as solid lines and dashed lines.

In the embodiment shown in FIG. 1, the image positioner means 24 is arranged externally to the device 10a, wherein the user-initiated motion 22 is processed into the device 10a via a data channel indicated by the arrow between the image positioner means 24 and the translation unit 20. In the preferable embodiment of the device 10b shown in FIG. 2, the image positioner means 24 is integrated into the device 10b. Hence, the device 10b is configured to both receive and translate the user-initiated motion 22. In this way, the user only needs to carry out the user-initiated motion 22 which is automatically translated into the first contour. This advantageously increases the segmentation efficiency.

The device 10a further comprises a motion parameter registering unit 26 for registering a motion parameter of the user-initiated motion 22 to the first contour. The motion parameter comprises a positioner speed being the speed of the image positioner means and/or a positioner acceleration being the acceleration of the image positioner means 24. In a preferable embodiment, the motion parameter registering unit 26 is configured to register the motion parameter by receiving a motion parameter measured by the motion parameter registering unit 26 itself and/or by the image positioner means 24 and/or by a separate motion measuring apparatus, in particular a motion sensor. The image positioner means 24 and/or the image positioner means 24 and/or the separate motion measuring apparatus may be configured to measure the motion parameter using optical and/or thermal and/or mechanical and/or magnetic and/or acoustic and/or other types of sensors or means and/or their combination(s). Preferably, the motion parameter comprises a speed and/or an acceleration of a mouse and/or a cursor and/or an electronic painting device, etc. In another embodiment, the motion parameter of the cursor may be measured when the user moves his finger on a touch screen or a contact-sensitive pad enabling the same or a similar function to the touch screen. Preferably, the motion parameter is registered to the entire first contour, i.e. every single image point such as pixel and/or voxel of the first contour. This means that every pixel and/or voxel of the first contour receives a specific value for the motion parameter.

Figure 2:
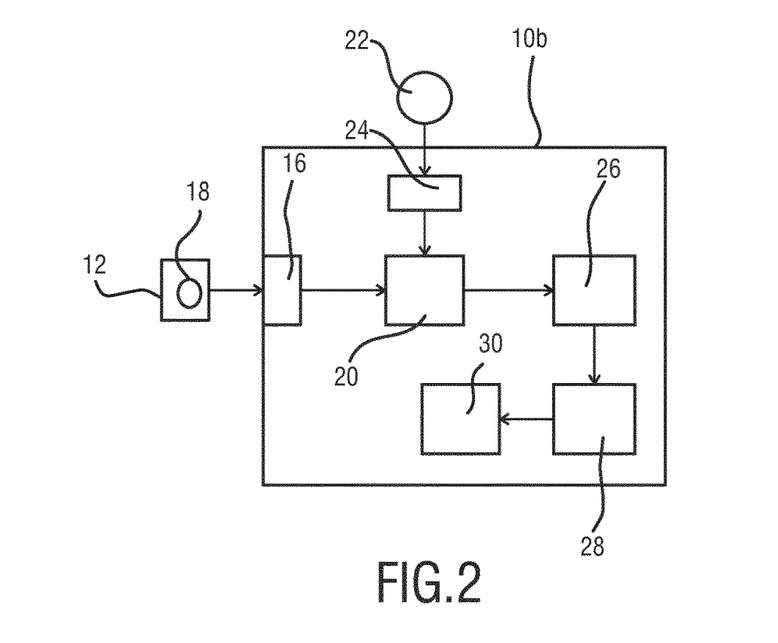
FIG. 2 shows a schematic block diagram of another embodiment of the device according to the present invention.
Figure 3:
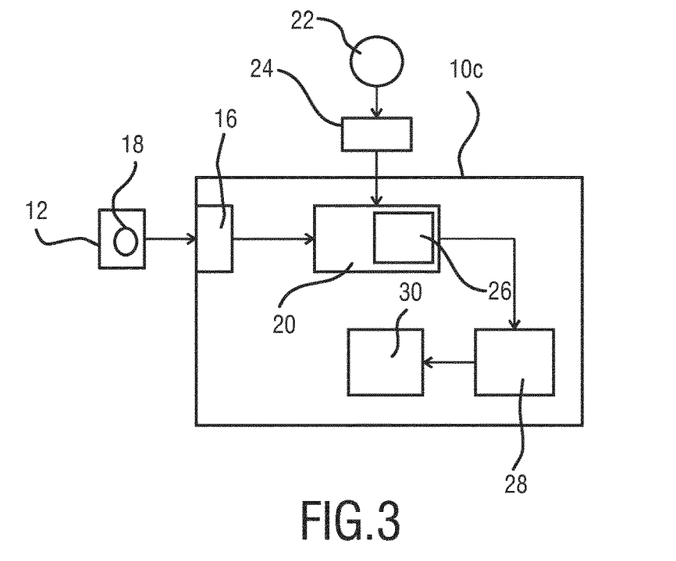
FIG. 3 shows a schematic block diagram of another embodiment of the device according to the present invention.

In another preferable embodiment of the device 10c shown in FIG. 3, the translation unit 20 and the motion parameter registering unit 26 are configured as a single element. In this way, translating the user-initiated motion into the first contour and registering the motion parameter to the first contour are done in one single step. This advantageously results in a more efficient image segmentation. It is understood that such a configuration is also applicable to the device 10b shown in FIG. 2.

The device 10a further comprises an image control point means 28 for distributing a plurality of image control points on the first contour with a density decreasing with the motion parameter. Within the scope of this invention, the density of the image control points refers to the number of image control points per unit length of the contour. In a preferable embodiment, the image control point means 28 is configured to cooperate with one or more graphic user interfaces (GUI). For instance, the GUI may comprise one or more control element such as buttons for the user to activate the distribution of image control points. Further, the image control point means 28 may enable the user to define the number of image control points so that when the desired number of image control points has been selected, the distance between adjacent image control points will be automatically chosen so that the density of the image control points decreases with the motion parameter. The distance between adjacent image control points refers to the length of the contour segment between the adjacent image control points. Preferably, the visual shape of the image control points may also be defined by the image control point means 28.

The device 10a further comprises a segmentation unit 30 for segmenting the image 12 by determining a second contour within the first contour based on the plurality of image control points, the segmentation unit being configured to use one or more segmentation functions. The one or more segmentation functions may comprise active contour and/or model based segmentation and/or graph cut. However, this is not limiting for the present invention and the segmentation functions may comprise one or more of level set, region growing, deformable contours, statistical shape models, interactive methods, wherein any combination of the aforementioned functions may be used for a specific case of image segmentation. The second contour may be the final result of the image segmentation. Alternatively, the device 10a may be configured to further adjust the determined second contour in order to create at least one third contour.

Figure 4:
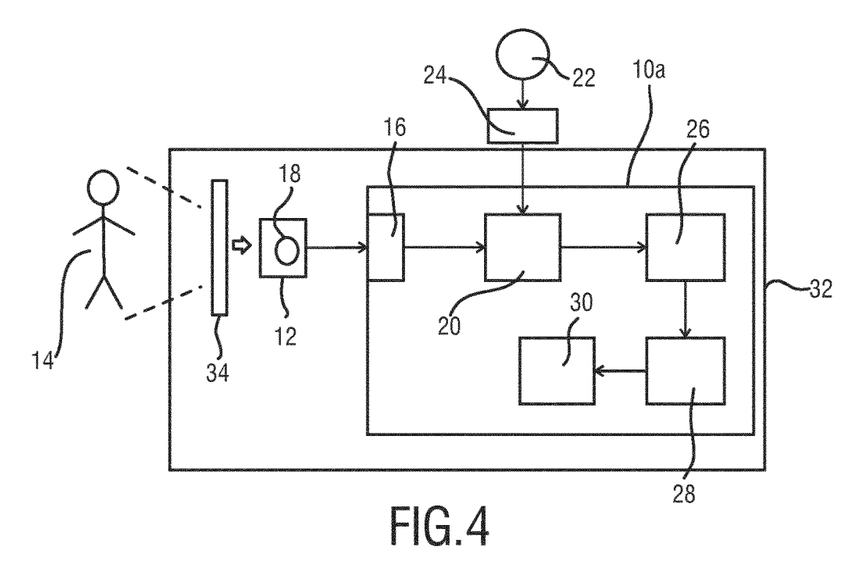
FIG. 4 shows a schematic block diagram of an embodiment of a system according to the present invention.

With reference to FIG. 4, a schematic block diagram of an embodiment of a system 32 is shown. The system 32 comprises an imaging apparatus 34 for generating at least one image, such as the image 12 of the subject 14, and a device 10a-c as disclosed herein for segmenting the generated image 12. The imaging apparatus 34 may comprise any imaging apparatus suitable for medical and/or biological imaging, including but without being limited to x-ray radiography, magnetic resonance imaging (MRI), medical ultrasonography or ultrasound, endoscopy, elastography, tactile imaging, thermography, medical photography and nuclear medicine functional imaging, positron emission tomography (PET), electroencephalography (EEG), magnetoencephalography (MEG), electrocardiography (ECG), etc. Preferably, the system 32 enables and/or supports radiotherapy planning In the embodiment shown in FIG. 4, the dashed lines between the imaging apparatus 34 and the subject 14 indicate that the entire subject 14 is imaged by the imaging apparatus 34. This is, however, not limiting for the present invention but serves only as an illustrative example for the image generation. The skilled person will understand that the imaging apparatus 34 may be configured to image one or more parts of a subject 14 locally. In the embodiment shown in FIG. 4, the system 34 comprises the device 10a shown in FIG. 1. It is, however, understood that also the other embodiments of the device 10b-c shown in FIG. 2 and FIG. 3 as well as disclosed elsewhere in the present invention may be integrated into the system 32 in order to segment the image 12 generated by the imaging apparatus 34.

Figure 5:
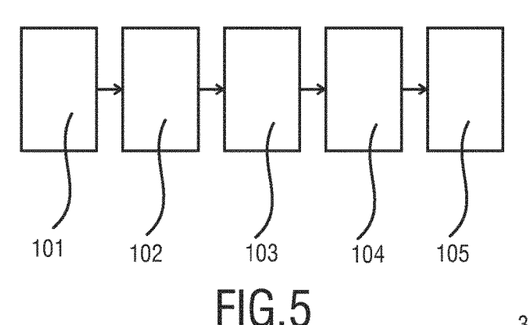
FIG. 5 shows a schematic block diagram of an embodiment of a method according to the present invention.
Figure 6:
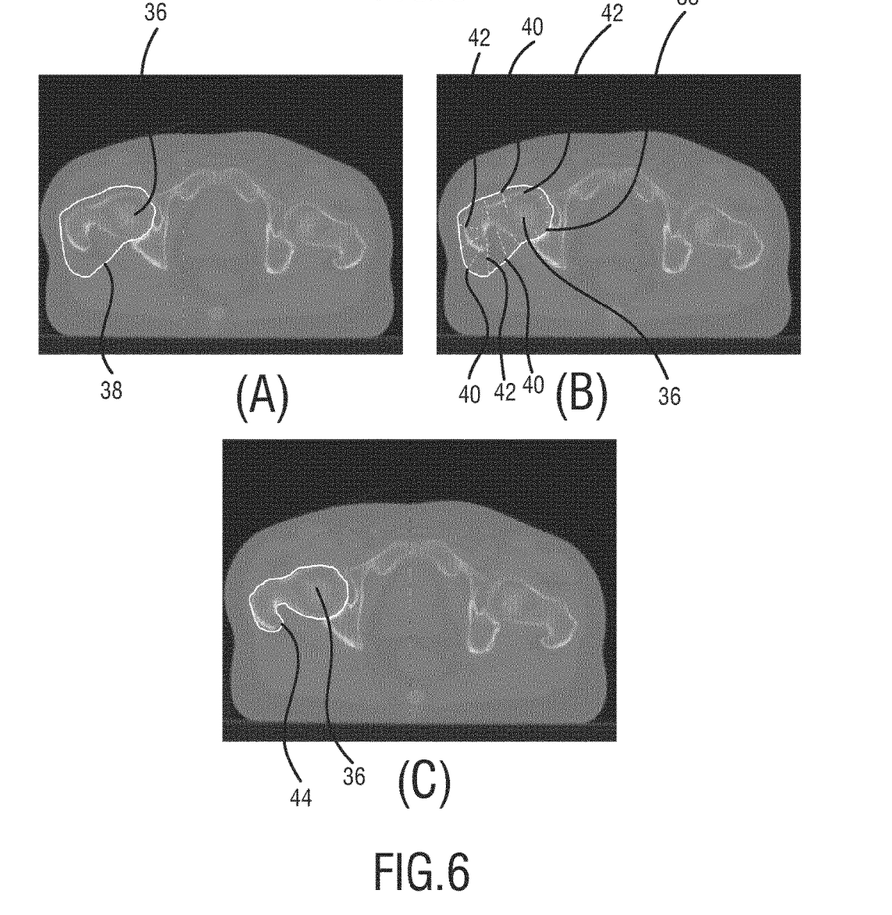
FIG. 6 shows a segmentation of a medical image.

With reference to FIG. 5, a schematic block diagram of a method in accordance with an embodiment is shown. In the following, the method in FIG. 5 will be explained with reference to an example of FIG. 6, which shows a segmentation of a medical image containing a femur head structure 36. In a first step 101, the image shown in FIG. 6A is received, wherein the femur head structure 36 is the encircled structure on the left hand side of FIG. 6A. The image may be generated by one or more afore-mentioned medical imaging technologies. In a second step 102, a user-initiated motion 22 of an image positioner means 24 is translated into an initial contour 38, which encircles the femur head structure 36 on the left hand side of FIG. 6A. It is understood that the image positioner means 24 may comprise any type of image positioner means mentioned with reference to FIGS. 1 to 3. Preferably, the user-initiated motion 22 is translated gradually during the duration of the user-initiated motion 22. Alternatively, the user-initiated motion 22 may be translated after it has been fully initiated by the user. It can be seen from FIG. 6A that the initial contour 38 around the femur head structure 36 is relatively precise in the contour region corresponding to the hip-joint (right end of the femur head structure 36) while the initial contour 38 is relatively coarse elsewhere. Regarding one embodiment of the present invention, in which the image positioner means 24 comprises a mouse, it can thus be assumed that the user moves the mouse relatively slowly for creating the region of the initial contour 38 corresponding to the hip joint, while he moves the mouse relatively quickly when creating other contour regions.

In a third step 103, a motion parameter comprising a speed and/or an acceleration of the image positioner means 24, such as the mouse, is registered to the initial contour 38. As mentioned above, the user may move the mouse with different speed when performing the user-initiated motion 22. In a fourth step 104, a plurality of image control points 40 are distributed on the initial contour 38 as shown in FIG. 6b. It is noted that for reasons of plausibility, only three of all image control points 40 are exemplarily indicated with a reference number in FIG. 6B. The image control points 40 are distributed with a density that decreases with the motion parameter, such as the speed of the mouse during the user-initiated motion 22. This can be seen in FIG. 6B, since the density of the image control points 40 is higher in the regions of the initial contour 38 corresponding to the hip-joint than in other regions of the initial contour 38, wherein the density is measured based on the distance between adjacent image control points 40 along the initial contour 38.

In a preferable embodiment, the image control points are used to identify a plurality of target points within the initial contour. In particular, the target points are identified within the image points (pixels and/or voxels) encircled by the initial contour 38 and/or directly lying on the initial contour 38. In an embodiment, the target points lie each within a volume and/or a path within the initial contour 38. In particular, the target points lay each within a curved and/or straight path beginning at a corresponding image control point 40 on the initial contour 38. In the embodiment shown in FIG. 6B, a target point is identified for each image control point on a straight path 42 shown in FIG. 6B starting from the corresponding image control point towards the interior of the initial contour 38. It is noted that for plausibility reasons only three of all straight paths 42 are assigned with a reference number in FIG. 6B. In the context of the active contour segmentation method, the straight paths 42 are known as search rays since the target point is searched along each search ray starting from the corresponding image control point 40. Preferably, each search ray is directed perpendicular to the edge of the initial contour 38. This means, the straight path 42 is perpendicular to a tangent of the initial contour 38 crossing the corresponding image control point 40. This is, however, not limiting for the present invention since one or more straight paths 42 may build any angle between 0° and 360° with the corresponding tangent.

In the active contour or model-based segmentation (MBS) method, an image parameter is analyzed along each straight path 42. Preferably, an image gradient is detected and analyzed along each straight path. This is, however, not limiting for the present invention since also other types of image parameters such as grey value and/or contrast maybe analyzed along the straight path 42. Further, the image parameter may be analyzed for other embodiments where the target points are searched within a volume and/or a curved path beginning at a corresponding image control point 40. Preferably, the image control points 40 may be distributed in one or more hexagonal grids perpendicular to a specific path. In another preferable embodiment, the target points are identified where a peak of the image parameter, in particular a gradient peak is detected within the straight path 42 or within a search path being a curved path or a search volume.

In the embodiment shown in FIG. 6B, the straight path 42 has a length which increases with the motion parameter, such as the mouse speed. This leads to straight paths 42 that are different in length, wherein the straight paths 42 in the region of the initial contour 38 corresponding to the hip-joint are comparably shorter than the other straight paths 42. Consequently, the gradient peak is searched within a shorter distance from the image control points 40 for the hip-joint than for other parts of the femur head structure 36. In another preferable embodiment, the maximum gradient peak is searched within one or more straight paths 42. This means that from a number of gradient peaks detected within the straight paths 40, the one with the maximum magnitude is chose to identify the target point. In still a further embodiment, the first gradient peak detected beginning from the corresponding image control point 42 is used to identify the target point. In another preferable embodiment, the target point is identified where a local second derivative to the next lying gradient peak is derived. In this way, a maximum gradient can be detected using a curved path crossing the corresponding image control point 40 and the identified target point.

After identifying the target points, the initial contour 38 may be adjusted to create an adjusted contour 44 in a fifth step 105. The result is shown in FIG. 6C, where the adjusted contour 44 corresponds to the femur head structure 36 with increased accuracy compared to the initial contour 38. Preferably, the adjusted contour 44 is formed by connecting adjacent target points.

Preferably, the one or more detected gradient peaks are compared with a predefined threshold gradient so that the target points are only identified if the gradient peaks are above the predefined threshold gradient. Further preferably, the user may change the predefined threshold gradient, for instance by a mouse-wheel movement. In this way, if the adjusted contour 44 does not reach the desired segmentation goal sufficiently well or in case the contour adjustment gets stuck before reaching the desired segmentation goal, the user may force the adjusted contour 44 further towards the femur head structure 36.

It is noted that the initial contour 38 corresponds to the first contour mentioned referring to FIGS. 1 to 3, whereas the adjusted contour 44 corresponds to the second contour.

The graph cut method may also be applied to generate the adjusted contour 44. For doing so, a ring-shaped band is determined which has the initial contour 38 as its outer boundary and an additional contour as its inner boundary. Here, the adjusted contour 44 corresponds to the first contour mentioned referring to FIGS. 1 to 3, whereas the additional contour corresponds to the second contour. The distance between the additional contour and the initial contour 38 is chosen to increase with the motion parameter registered to the initial contour 38, such as the mouse-speed. This results in a ring-shaped band whose bandwidth is comparatively large for the LARs such as the regions of the initial contour 38 except for the hip-joint, while the bandwidth is comparatively small for the contour region corresponding to the hip-joint.

After defining the ring-shaped band within the initial contour 38, a regular graph cut based on image intensities may be performed, for instance by assigning all the image points (pixels and/or voxels) on the initial contour 38 to a source node and/or the image points (pixels and/or voxels) on the additional contour to a sink node. The image points assigned to the source node build a background while the image points assigned to the sink node build a foreground. The graph-cut method then generates a final contour while taking the motion parameter, such as the mouse speed into account. Preferably, an arrow pointing from the source node may be assigned to each image point of the background and/or the foreground. The afore-mentioned arrows may carry weights which are determined based on the grey value difference between neighboring image points and/or the grey value distance to a priori knowledge on the foreground and the background. The graph cut is defined as a partitioning of graph nodes into a part connected to the source node and a part connected to the sink node eliminating all the edges between the two partitions, such that the sum of weights of the cutting edges, known as the cut-cost, is minimum. It is understood that also other variants of the graph cut method may also be applied to determine the final contour here.

As mentioned in the graph cut method, the image control points 40 on the initial contour 38 are used as an input to build a graph of image points (pixels and/or voxels) within the ring-shaped band. In another preferably embodiment, one or more target points are identified for defining the ring-shaped band. In still a further preferable embodiment, a maximum distance between the initial contour 38 and the additional contour is determined. In particular, the maximum distance marks a bandwidth beyond which the image content within the initial contour 38 is defined as the sink node. In still a further embodiment, the final contour comprises a bandwidth which varies, in particular in dependence upon the motion parameter, such as the mouse speed.

In one or more embodiments, the image 12 comprises a first and at least one second image slice, wherein the structure 18 and/or the first contour and/or the second contour may be transferred from the first to the second image slice. Preferably, the second contour is dilated or moved outwards after being transferred. Further preferably, the second contour is further adjusted to form a third contour, wherein the second contour is treated in the same or a similar way to the first contour, except that the motion parameter is homogeneous all over the second contour. In a further preferable embodiment, the structure 18 is transferred and dilated and then adjusted to the second image slice wherein the structure 18 is treated in the same or a similar way to the first contour but with homogeneous motion parameter. In this way, the user is able to trigger a propagation, i.e. an automatic adaptation of the contour to a similar image with the same concept, to one or more next slices after checking the current adjustment and, if necessary, correcting it. Further, if the user triggers the propagation, the segmentation process may be applied to a plurality of next slices until it is stopped, for instance by a quality measure. Then, the user is able to scroll through the different slices and only retrigger the propagation, if he has to make a correction of the segmentation result, such that for the next few slices the corrected version is propagated. This enables very fast segmentation of a 3D structure, while still taking any user input into account. The quality measure and a re-propagation triggered by user adjustments ensure, that only reasonable results which require no or little editing are shown to the user, such that the time to correct errors is very small. If the algorithm cannot determine a good contour, the user will contour from scratch, which is usually much faster than doing many corrections.

In another preferable embodiment, the third contour is predicted in the second image slice without user interaction. Preferably, a plurality of additional image control points 40 may be distributed without using the motion parameter, wherein the path corresponding to the additional image control points comprise a length correlated with a curvature of the structure 18. In another preferable embodiment, gradient strength and/or grey value profile may be analyzed to identify an optimum third contour in the second slice.

In another preferable embodiment, the present invention enables partial automation of the delineation, in particular for non-trained structures. This is advantageous since the segmentation time can be further reduced. In another preferable embodiment, the present invention utilizes one or more previously generated contours of the structure 18, such as from neighboring slices in order to carry out the image segmentation. This is advantageous, since information about the structure 18, such as the presence of local image ambiguities, become available so that the accuracy of the segmentation result is further increased.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A device for segmenting a diagnostic image of a subject, comprising:
   a data interface for receiving the diagnostic image of said subject, said image depicting anatomical structure of said subject;
   a translation unit for translating a user-initiated motion of an image positioner means into a first contour surrounding said anatomical structure for display on a display device;
   a motion parameter registering unit for registering a motion parameter of said user-initiated motion to said first contour, said motion parameter comprising a speed and/or an acceleration of said image positioner means;
   an image control point unit for distributing a plurality of image control points on said first contour with a density decreasing with said motion parameter; and a segmentation unit for segmenting said image displayed on the display device by determining a second contour within said first contour based on said plurality of image control points, said segmentation unit being configured to use one or more segmentation functions.

2. The device according to claim 1, wherein said segmentation unit is configured to identify a plurality of target points within said first contour, said target points lying each within a volume and/or a path beginning at a corresponding one of said image control points, said second contour being formed by connecting said plurality of target points.

3. The device according to claim 2, wherein said path comprises a straight path, said straight path being perpendicular or oblique to an edge of said first contour and/or having a length increasing with said motion parameter.

4. The device according to claim 2, wherein said segmentation unit is configured to analyze an image parameter of said image over said volume and/or said path and identify said target points where it detects a peak of said image parameter.

5. The device according to claim 4, wherein said image parameter comprises an image gradient, said segmentation unit being configured to identify said target points where it detects a gradient peak of said image gradient.

6. The device according to claim 5, wherein said gradient peak comprises a maximum gradient peak and/or a first gradient peak beginning from said image control point.

7. The device according to claim 5, wherein said segmentation unit is configured to identify said target points only if said gradient peak is above a predefined threshold gradient.

8. The device according to claim 1, wherein said second contour comprises a distance to said first contour increasing with said motion parameter.

9. The device according to claim 1, wherein said image comprises a first and at least one second image slice, further comprising a transferring unit for transferring said structure and/or said first contour and/or said second contour from said first to said at least one second image slice.

10. The device according to claim 1, wherein said image control point unit is configured to distribute a plurality of additional image control points without using said motion parameter.

11. The device according to claim 1, wherein said motion parameter registering unit is configured to signal an error when said motion parameter is below a predefined threshold parameter.

12. The device according to claim 1, wherein said segmentation unit is configured to use active contour, model based segmentation and/or graph cut as segmentation function.

13. A system for segmenting a diagnostic image of a subject, comprising:
an imaging apparatus for generating at least one diagnostic image of anatomy of said subject; and
a device as claimed in claim 1 for segmenting said generated at least one diagnostic image.

14. A method for segmenting a diagnostic image of a subject, comprising the steps of:
receiving a diagnostic image of said subject generated by a diagnostic imager, said diagnostic image depicting an anatomical structure of said subject;
translating a user-initiated motion of an image positioner means into a first contour surrounding said anatomical structure displayed on a display device;
registering a motion parameter of said user-initiated motion to said first contour, said motion parameter comprising a speed and/or an acceleration of said image positioner means;
distributing a plurality of image control points on said first contour with a density decreasing with said motion parameter; and
segmenting said image by determining a second contour within said first contour based on said plurality of image control points, said segmentation unit being configured to use one or more segmentation functions, wherein the diagnostic image, the first contour, and the second contour are configured for display on the display device.

15. A non-transitory computer-readable medium carrying program code for controlling a computer to carry out the steps of the method as claimed in claim 14.

16. The method according to claim 14, wherein said segmenting identifies a plurality of target points within said first contour, said target points lying each within a volume and/or along a straight path beginning at a corresponding one of said image control points and extending inward, said second contour being formed by connecting said plurality of target points.

17. The method according to claim 16, wherein said segmenting includes analyzing an image parameter of said image over said path and identifying said target points where the analyzing determines a peak of said image parameter.

18. A device for segmenting a diagnostic image of a subject generated by a diagnostic imager, the device comprising:
a data interface configured to receive the diagnostic image of the subject, the image depicting anatomical structure of the subject;
a computer configured to:
translate a user-initiated motion of a user input device into a first contour around the anatomical structure and control a monitor to display the anatomical image with the first contour;
register to the first contour a speed and/or acceleration of the user-initiated motion of the user input device;
define a plurality of image control points on the first contour with a density of the plurality of image control points decreasing with the speed and/or acceleration of the at least one user input device; and
segment the diagnostic image by determining a second contour within the first contour based on the plurality of image control points using one or more segmentation functions and control the display device to display the second contour with the anatomical image.

19. The device according to claim 18, wherein the processor is further configured to:
identify a plurality of target points within the first contour, the target points each lying within a volume of the first contour and along a straight path beginning at a corresponding one of the image control points and extending into the volume;
analyze an image parameter of the image along the straight paths and identify the target points where a peak of the image parameter is detected; and
connect the plurality of points to define the second contour.

20. The device according to claim 19, wherein the straight path extends perpendicular or oblique to an edge of the first contour inward and has a length increasing with the speed and/or the acceleration of the user-initiated motion of the user input device.

* * * * *